Patented June 24, 1924.

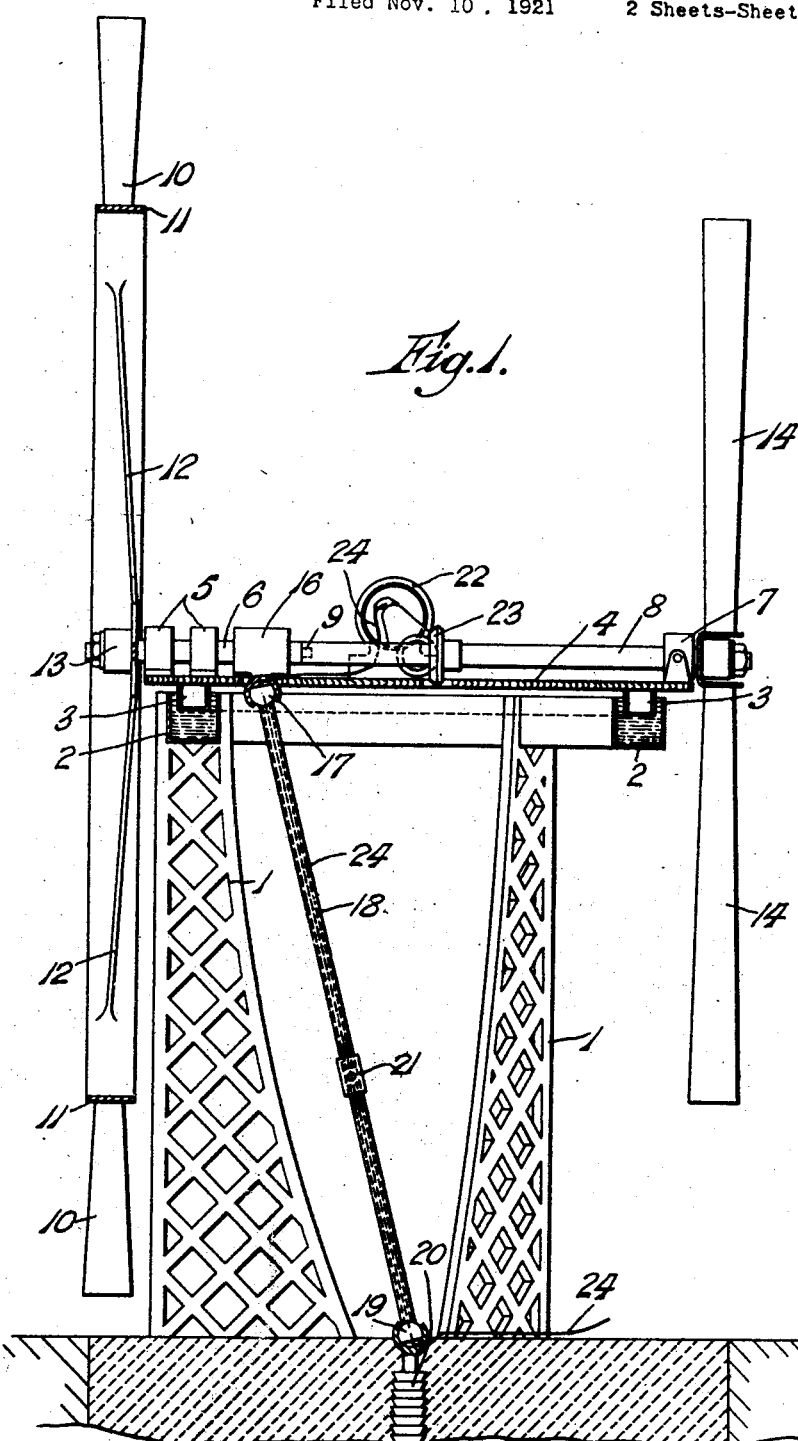

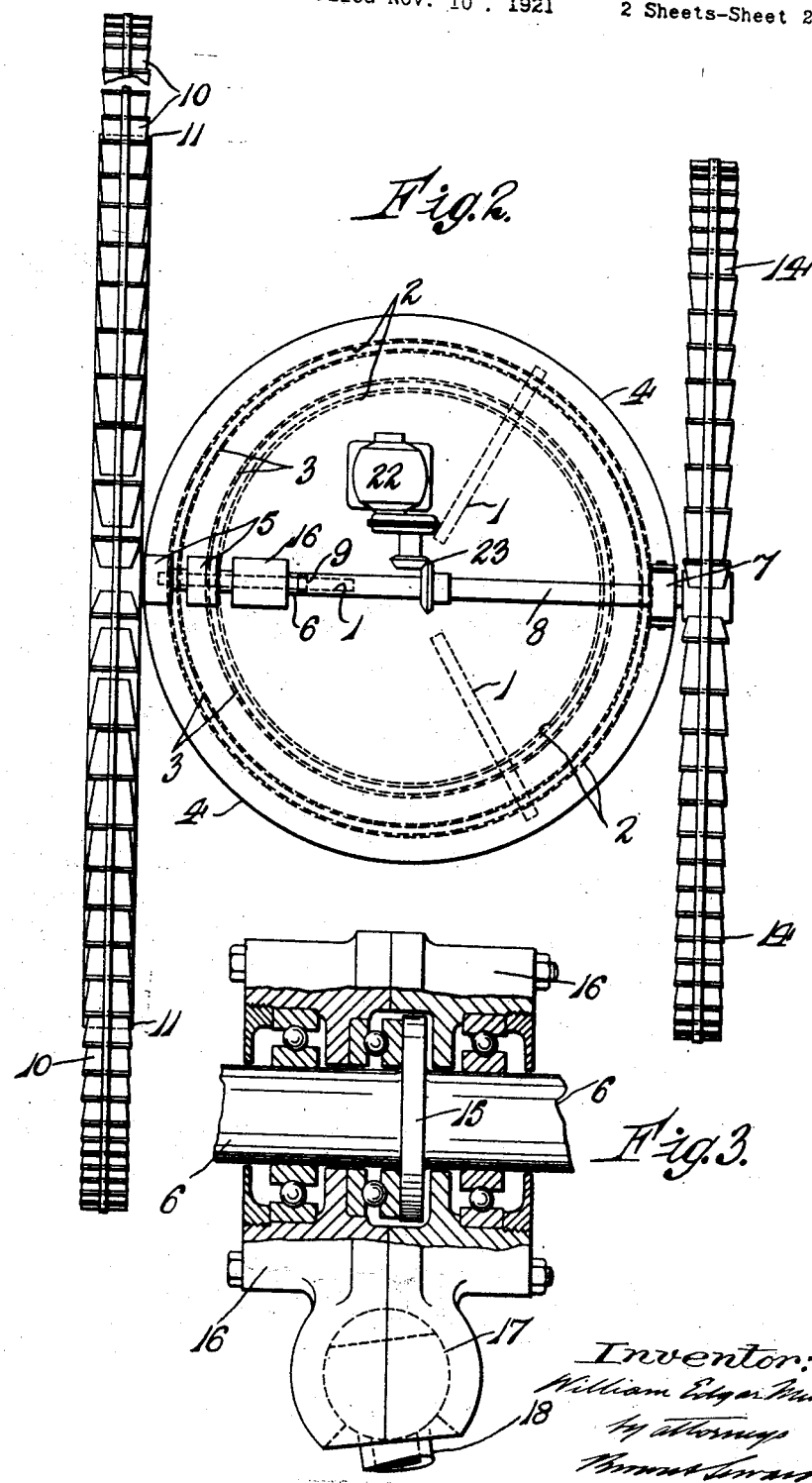

1,498,978

UNITED STATES PATENT OFFICE.

WILLIAM EDGAR MUNTZ, OF LONDON, ENGLAND.

WINDMILL AND THE LIKE.

Application filed November 10, 1921. Serial No. 514,301.

*To all whom it may concern:*

Be it known that I, WILLIAM EDGAR MUNTZ, a subject of the King of Great Britain, and resident of 24, Southampton Buildings, London, England, late of His Majesty's Public Works Department, India, have invented new and useful Improvements in Windmills and the like, of which the following is a specification.

In bye gone days before the invention of the steam-engine and when, before the repeal of the corn laws, practically the whole of the grain in the United Kingdom was home-grown, it was ground locally for the farmers by mills driven by water power where available or in the alternative by windmills which have more and more fallen into disuse but of which the ruins are still in evidence throughout the country side.

These windmills were all more or less constructed on the same pattern i. e. a hollow brick-work tower sheltering the grinding machinery of the mill proper and on the summit of them a platform capable of being revolved supporting the axle geared up to the mill stones the "sails" or vanes rigidly attached to this axle being so designed as to cause it to revolve by the force of the wind sliding off them—at an angle as it passed through this wind wheel.

These sails were evidently purposely made of fabric stretched over light wooden frames so as to reduce to a minimum the over-hanging weight of the wind wheel.

The extremity of the axle remote from the on-coming wind was embraced by the eye of a strut extending outwards and downwards to the ground with a friction wheel inserted in that end running on a circular tram-line around the supporting tower so as to allow of the platform supporting the axle and sails being revolved by a hand-winch to oppose these sails to the wind at such angle as desired.

As steam engines with a cheap coal supply came more and more into general use and as grain was imported from abroad in ever-increasing quantities, the grinding of it locally fell more and more into desuetude but a certain demand arose for windmills apparently originating in the Colonies, to pump water from wells for domestic use and this demand has been met by the construction of small galvanized iron wheels having a large number of vanes inclined to the direction of the wind and almost overlapping and having further a rudder or tail serving to automatically oppose the full width of the wheel to an ever varying direction of the wind.

The design of these metallic wind wheels whilst probably tending to increase efficiency and eliminate the factor of damage to the sails by gales, had however this very serious disadvantage of enormously increasing their over-hanging weight which our ancestors so evidently foresaw would involve not only undue fatigue on the axle itself and uneven friction on its bearings but militate seriously against that balance of the revolving platform so necessary to avoid distortion of the super-structure besides increasing the resistance to the automatic adjustment to meet the on-coming wind.

The object then of this my invention is so to modify the design of the metallic windmills to day in general use, that whilst conserving their advantages over those of our ancestors I eliminate and neutralize the factor of increased over-hanging weight with its consequential drawbacks as above enumerated.

In carrying out my invention one or more wind wheels or other rotative power absorbing members are supported by an annular float to which is connected one end of a tie rod, the other end being anchored where the axis of rotation of the float cuts the ground, the whole being so arranged as to allow the float freely to turn and to tilt.

Preferably I provide two wind wheels one of which is mounted at one end of a shaft and the other at the other end, the axis of said shaft passing through the axis of revolution of the float; the wind wheels have equal moments on the supporting shaft bearings so that one may balance the other and give an even distribution of pressure on the shaft bearings and on the float. If the wind wheels are equidistant from the axis of revolution of the float they will be made of the same weight.

The float may conveniently have secured thereto a platform on which the shaft bearings and possibly a dynamo or other actuated machinery are mounted.

The float is fluidly supported in an annular tank which is preferably mounted on three latticed steel or wooden legs positioned one at each corner of an equilateral triangle.

The tank is of such depth and width as will allow of the immersion of the float therein whilst ensuring under all circumstances its complete flotation i. e. that the float shall never touch the bottom of the tank, and that no half of its circumference can under any conditions be entirely submerged by thrust due to the maximum wind pressure, the weight of the float together with that of the wind wheels and shaft, the supporting platform, and if desired a dynamo or other machinery, being at the same time held under consideration.

To this revolving platform, I attach a tie-rod, preferably tubular, whose other extremity is anchored where the axis of rotation of platform cuts the ground and at each of its ends is a universal joint to allow of the tilting over of the platform and float as a whole by wind pressure whilst at the same time preventing the latter touching the sides of the tank.

As in the present day type of windmill, a rudder may be affixed if found desirable to automatically hold the wheels up to the wind.

Preferably too one of the wheels would be of considerably larger diameter than the other, the space occupied by its vanes being annular along its circumference and the smaller wheel being of approximately the same diameter as the un-obstructed centre of the larger one, the sectional areas of those parts of the surface of each wheel filled in with vanes when taken across the direction of the wind being preferably equal.

I do not wish to limit my invention to the lattice work legs I judge best to minimize obstruction of the wind nor do I wish to limit it to a double wheel nor to an annular fluid tank as the platform may revolve on any modification of a water slide or any greased equivalent or even on conical rollers or balls; my invention in its best form comprises the combination of two wind wheels one on each side of their supporting platform and the outside bearings of their shaft being as close to the circumference of this platform as may be found feasible, with an annular float or equivalent device which shall give an ever-increasing counter-thrust against any tilting that may occur of the revolving platform whilst conserving a minimum of resistance to its automatic adjustment.

Each of these two integers or factors I believe to be new as applied to windmills or the like, whether of the metallic-vaned type or otherwise and I also believe that with two opposed wheels on the same shaft, the vaned-area in one being complementary to the vaned-area in the other, is a novelty.

When two wheels are employed I preferably mount one of them on a shaft rotating in fixed bearings whilst the other wheel is mounted on a shaft rotating in the rocking bearing, the adjacent ends of the shafts being coupled together as by forming the one with a squared end located within a squared recess in the end of the other, play being allowed so that should the wind pressure tend to tilt over one of the wheels, the corresponding wind pressure on the other wheel will in part or in whole neutralize this tendency to tilt.

In the accompanying drawings which illustrate the invention Figure 1 is a section. Figure 2 is a plan thereof, and Figure 3 is a detail view.

1 are latticed girders on the top of which is mounted an annular tank 2 containing liquid. 3 is an annular float floating in the tank 2 and having mounted upon it a platform 4 carrying fixed bearings 5, for a shaft 6 and a rocking bearing 7 for a shaft 8. The shaft 8 is provided with a squared recess the walls of which are engaged preferably with a certain amount of play by the squared end 9 of the shaft 6. Mounted upon the shaft 6 is a wind wheel 10 comprising a number of vanes carried by a rim 11 which is carried by spokes 12 on a hub 13. 14 is a wind wheel mounted on the shaft 8 and comprising a number of vanes the diameter of the wheel 14 being approximately equal to the interior diameter of the rim 11, the combined area of the vanes on the wheel 10 being also approximately equal to the combined area of the vanes on the wheel 14.

A casing 16 is carried by ball bearings on the shaft 6, and between the casing 16 and a flange 15 on the shaft 6 is interposed a thrust bearing. The casing 16 is connected by a ball and socket joint 17 to a tie-rod 18 the other end of which is similarly provided with a ball 19 engaging a socket carried by a foundation bolt 20 let into the concrete or other foundation and situated in line with the normal axis of rotation of the float 3. The tie-rod 18 is provided with a right and left hand threaded sleeve 21 by means of which the length of the rod 18 can be adjusted. 22 is a dynamo mounted on the platform 4 and connected by gearing 23 to the coupled shafts 6, 8.

Current is led from the dynamo 22 by insulated cables 24 passing through the hollow tie-rod 18.

It will be seen that when the wheels 10 and 14 are subjected to uneven fluid pressure, the shafts 6, 8, will tend to tilt in opposite directions.

What I claim is:—

1. A rotary prime mover adapted to be actuated by fluid pressure comprising, a rotative power absorbing member, and a shaft therefor, said shaft being supported on a yielding rotatable member.

2. A rotary prime mover adapted to be actuated by fluid pressure comprising, a rotative power absorbing member, and a shaft therefor, said shaft being supported on a floating rotatable member.

3. A rotary prime mover adapted to be actuated by fluid pressure comprising, a rotative power absorbing member, a shaft therefor, and supporting mechanism for said shaft, said supporting mechanism including a float upon which said shaft is mounted and a liquid containing tank adapted to receive and support the float.

4. A rotary prime mover adapted to be actuated by fluid pressure comprising, a rotative power absorbing member, a shaft therefor, and supporting mechanism for said shaft; said supporting mechanism including a circular float upon which said shaft is mounted and a liquid containing circular tank adapted to receive and support the float.

5. A rotary prime mover adapted to be actuated by fluid pressure comprising, a rotative power absorbing member, and a shaft therefor, said shaft being supported on a yielding rotatable member, said member being connected at a point away from its axis of rotation with a fixed point spaced from said member and in line with its axis of rotation.

6. A rotary prime mover adapted to be actuated by fluid pressure comprising, a rotative power absorbing member, and a shaft therefor, said shaft being supported on a floating rotatable member, said member being connected at a point away from its axis of rotation with a fixed point spaced from said member and in line with its axis of rotation.

7. A rotary prime mover adapted to be actuated by fluid pressure comprising, a pair of rotative power absorbing members, shafts therefor, said shafts being supported on a yielding rotatable member and being connected against relative rotary movement while permitting lateral play.

8. A rotary prime mover adapted to be actuated by fluid pressure comprising, a pair of rotative power absorbing members, shafts therefor, said shafts being suported on a floating rotatable member and being connected against relative rotary movement while permitting lateral play.

9. In a windmill, a pair of vane wheels, and a common shaft upon which said wheels are mounted, said shaft being divided and the parts connected so as to prevent relative rotary movement but permit lateral play, one of said wheels having its operative area disc-shaped and the other having its operative area annular in shape.

In testimony that I claim the foregoing as my invention I have signed my name this 21st day of October 1921.

WILLIAM EDGAR MUNTZ.